(12) United States Patent
Komatsu et al.

(10) Patent No.: US 8,959,498 B2
(45) Date of Patent: Feb. 17, 2015

(54) PARALLELIZATION METHOD, SYSTEM AND PROGRAM

(75) Inventors: Hideaki Komatsu, Kanagawa (JP); Takeo Yoshizawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 13/031,666

(22) Filed: Feb. 22, 2011

(65) Prior Publication Data

US 2011/0209129 A1    Aug. 25, 2011

(30) Foreign Application Priority Data

Feb. 22, 2010    (JP) .................................. 2010-035691

(51) Int. Cl.
*G06F 9/45* (2006.01)

(52) U.S. Cl.
CPC ...................................... *G06F 8/456* (2013.01)
USPC .......................................... 717/149; 717/144

(58) Field of Classification Search
USPC ......................................................... 717/149
See application file for complete search history.

(56) References Cited

U.S. PATENT DOCUMENTS 6,609,216 B1 *   8/2003  Almy et al. ...................... 714/25
7,793,276 B2 *   9/2010  Dai et al. ...................... 717/149

FOREIGN PATENT DOCUMENTS

| JP | H09167144  | 6/1997  |
| JP | H09171405  | 6/1997  |
| JP | 2001092647 | 4/2001  |
| JP | 2003091422 | 3/2003  |
| JP | 2007511835 | 5/2007  |
| JP | 2009251044 | 10/2009 |

* cited by examiner

*Primary Examiner* — Li B Zhen
*Assistant Examiner* — Sen Chen
(74) *Attorney, Agent, or Firm* — Jeff Tang

(57) ABSTRACT

A parallelization method, system and program. A program expressed by a block diagram or the like is divided into strands and a balance in calculation time is made among the strands. The functional blocks are divided into strands and the strand involving the maximum calculation time from a strand set is found. One or more movable blocks in the strand involving the maximum calculation time is found. The next step is obtaining calculation time of each strand after the movable block is moved to the strand in the input or output direction according to its property, and moving the block to a strand most largely reducing the calculation time of the strand having the maximum calculation time before the movement. This process loops until calculation time is no longer reduced. Strands are then transformed into source codes. Source codes are compiled and assigned to separate cores or processors for execution.

15 Claims, 15 Drawing Sheets

| NUMBER OF DEFINER BLOCKS / NUMBER OF USER BLOCKS | 0 | 1 | >1 |
|---|---|---|---|
| 0 | ASSIGN BLOCK TO ADJACENT STRAND INCLUDING BLOCK HAVING NUMBER OF USER BLOCKS = 0 AND NUMBER OF DEFINER BLOCKS = 0 | ASSIGN BLOCK TO ADJACENT STRAND INCLUDING BLOCK HAVING NUMBER OF USER BLOCKS = 0 | ASSIGN BLOCK TO ADJACENT STRAND INCLUDING BLOCK HAVING NUMBER OF USER BLOCKS = 0 |
| 1 | ASSIGN BLOCK TO ADJACENT STRAND INCLUDING BLOCK HAVING NUMBER OF DEFINER BLOCKS = 0 | ASSIGN BLOCK TO STRAND INCLUDING DEFINER BLOCK HOWEVER, MAY BE RE-ASSIGNED LATER FOR BALANCING LOAD | ASSIGN BLOCK TO STRAND INCLUDING USER BLOCK |
| >1 | ASSIGN BLOCK TO ADJACENT STRAND INCLUDING BLOCK HAVING NUMBER OF DEFINER BLOCKS = 0 | ASSIGN BLOCK TO STRAND INCLUDING DEFINER BLOCK | REDUNDANTLY ASSIGN BLOCK TO STRANDS INCLUDING USER BLOCKS IN USER BLOCK SET |

FIG. 12

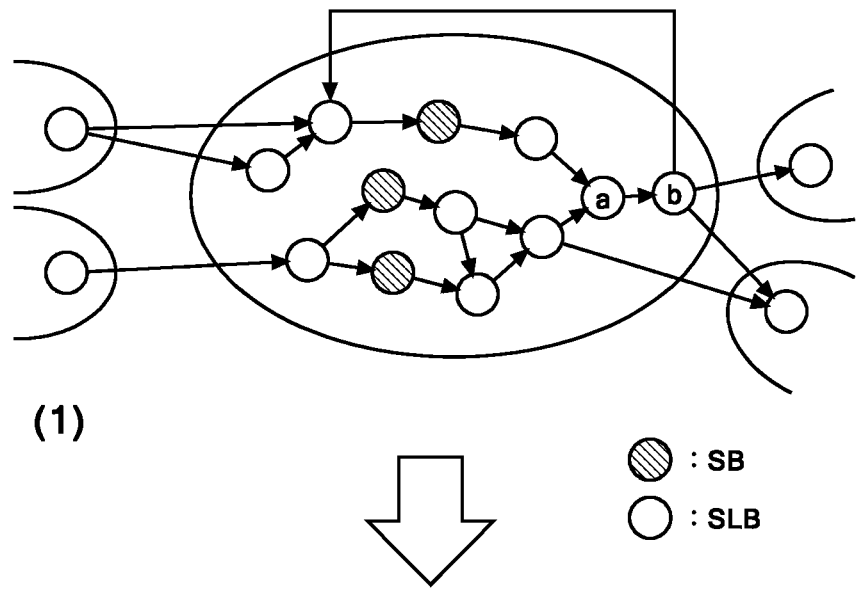
(1)
◉ : SB
○ : SLB
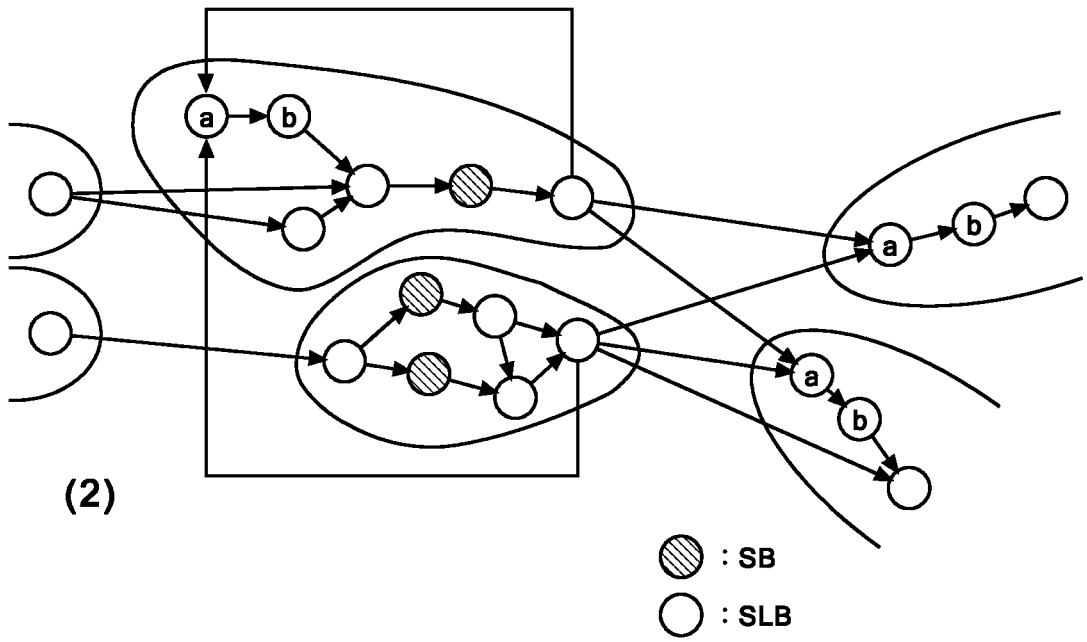
(2)
◉ : SB
○ : SLB
FIG. 19

PARALLELIZATION METHOD, SYSTEM AND PROGRAM

CROSS REFERENCE TO RELATED APPLICATION

This invention claims priority under 35 U.S.C. 119 from Japanese Application 2010-35691, filed Feb. 22, 2010, the entire contents of which are herein incorporated by reference.

BACKGROUND OF THE INVENTION

1. Field of the Invention

The present invention relates to a technique for reducing program execution time by parallelizing processes in a simulation system.

2. Description of Related Art

In recent years, a so-called multiprocessor system, including multiple processors, has been widely used in fields such as scientific computation and simulation. In such a system, an application program generates multiple processes and assigns the processes to individual processors. Then, the processors perform the processes in parallel while communicating with each other by using, for example, a shared memory space.

A simulation technology has been developed for this. The simulation system uses software for simulation in the mechatronics plants of a robot, a vehicle, an airplane, and the like. The development in electronic components and software technology has enabled electronic control of a major part of a machine such as a robot, a vehicle, or an airplane, by using a wireless LAN, wire connections, or the like spread over the machine as nerves are.

Although such a machine is fundamentally a mechanical device, it has massive control software installed therein. Accordingly, in product development, a great amount of time, cost, and people are required for the development of control programs and tests of the programs.

Hardware in the loop simulation (HILS) is a technique that has been conventionally used for such tests. In particular, an environment for testing the electronic control units (ECU) of an entire vehicle is called full-vehicle HILS. In full-vehicle HILS, actual ECUs are connected to a special hardware device for emulating an engine mechanism or a transmission mechanism, for example, in a laboratory. Tests are then carried out for predetermined scenarios. Outputs from the ECUs are inputted to a monitoring computer, and are then displayed on a display. Thus, the test operator checks for any abnormal operation while looking at the display.

However, in HILS, a special hardware device is required, and physical wiring needs to be made between the special hardware device and actual ECUs. Thus, HILS involves much advance preparation. In addition, when a test is to be performed by replacing ECUs with different ones, the wiring needs to be physically rearranged. This requires time and effort. Moreover, since this tool uses actual ECUs, real-time testing is needed. Accordingly, when tests are performed for many scenarios, a large amount of time is required. Furthermore, a hardware device for HILS emulation is generally extremely expensive.

To address the disadvantages of HILS, a technique using software without using any expensive emulation hardware device, called software in the loop simulation (SILS), has been recently proposed. In SILS, plants such as a microcomputer mounted in the ECU, an input/output circuit, control scenarios, an engine, a transmission, and the like are all emulated by a software simulator. By use of this technique, a test can be carried out without using actual ECU hardware.

An example of a system for supporting implementation of SILS is MATLAB®/Simulink®, which is a simulation modeling system available from The MathWorks, Inc. By using MATLAB®/Simulink®, a simulation program can be created by arranging functional blocks on a display through a graphical interface, and then specifying process flows as shown by arrows in FIG. 1. The block diagram represents a process in one time-step of the simulation. Time-series behaviors of a system to be simulated can be obtained by iterative execution of this process a predetermined number of times.

When a block diagram including the functional blocks and the like is created by MATLAB®/Simulink®, each function can be transformed into a source code describing an equivalent function in a known computer language, such as C language, by a function of Real-Time Workshop®. By compiling the C source code, a simulation can be performed as an SILS in a different computer system.

FIG. 1 shows a schematic diagram of a loop of typical functional blocks in MATLAB®/Simulink®. Functional blocks are mainly classified into blocks with internal state and blocks without internal state. In FIG. 1, hatched blocks A and B are blocks with internal state, and non-hatched blocks a, b and c are blocks without internal state.

In blocks without internal state, output data is calculated immediately from input data and then is outputted as shown in FIG. 2A.

On the other hand, in blocks with internal state, a value obtained by certain computing on previously inputted data is held as internal data 202, and output data is calculated by use of the internal data 202, as shown in FIG. 2B. To be more specific, currently inputted data is not used for calculation of data to be currently outputted, but is held as the internal data 202 for calculation of the next output data, after completion of the calculation of data to be currently outputted.

A description is given of a configuration of the block diagram shown in FIG. 1. Here, reference letter f1 denotes output from block A; f2, output from block a; f3, output from block B; f4, output from block b; and f5, output from block c. In this case, f1 is inputted into block a; f2, into block B; f3, into block b; f4, into block c; and f5, into block A. However, the blocks A and B have internal states, and thus do not directly use inputs f5 and f2 to calculate f1 and f3, respectively, as described above. The following shows a pseudo code describing the above:

```
while (ts < EOS) {
    // Output
        f1 = Aout(SA)
        f2 = a(f1)
        f3 = Bout(SB)
        f4 = b(f3)
        f5 = c(f4)
    // Update state
        SA = Ain(f5)
        SB = Bin(f2)
    // Update time
        ts++
}
```

The pseudo code above shows that a while loop is repeated until a time is reaches the end of simulation (EOS). In the code, for example, Aout( ) is a function for the block A to calculate output based on the internal state; Ain( ) a function for the block A to calculate an internal state variable based on the input; and a( ) a function for the block a to calculate output based on the input.

As seen from the pseudo code, in order to calculate outputs, the block A uses its internal state, and the block a uses the output from the block A. These calculations do not use output from the blocks B, b and c.

On the other hand, the blocks B, b and c do not use the output from the blocks A and a, either. This suggests that a process for A and a, and a process for B, b and c can be executed in parallel. As shown in FIG. 3, in preferable execution, the system assigns the process for A and a, and the process for B, b and c to different processors or cores, and then executes the processes in parallel. Subsequently, the system inputs output from the block a to the block B, and inputs output from the block c to the block A. Thereafter, the system proceeds to the next parallel process execution. In other words, processes divided by erasing a flow to each block with internal state can be executed in parallel in one iteration only.

However, in many cases, such simply erasing of a flow to each block with internal state does not lead to sufficient division of a model, that is, it does not enable parallelization. For example, in a case in FIG. 13, even after the erasing of flows, all the blocks are consequently connected to each other, and are not parallelized at all. This phenomenon occurs because the blocks cannot be divided due to the presence of a block without internal state which receives and unifies two or more signals. Many models tend to cause such a phenomenon. Accordingly, high parallelization is not expected by only a simple method as described above.

Japanese Patent Application Publication No. 2003-91422 relates to a method for automatically converting a non-parallelized source code having a multiple loop structure into a parallelized source code executable by multiple processors and discloses an automatic generation program P of massively-parallelized source code for multiple iterative processing. This program P automatically generates a parallelized source code executable in parallel by m processors (m is an integer of 2 or more) from a non-parallelized source code including an n-fold nested loop (n is an integer of 2 or more). The program P causes a CPU to implement a function to transform the n-fold loop structural part into a structure of processes divided to be executable by the m processors. For this transformation, an initial value formula of each of the n-fold loops of a non-parallelized source code SC is rewritten to an initial value formula Sj expressed by using m continuous integers iak (k=0, . . . , m−1) and an incremental value δj defined for each iteration of a loop j (j=1, . . . , n). Here, the integers iak start from 0 and are assigned to the m processors to uniquely identify the m processors. Then, the n-fold loop structural part is transformed by using the rewritten initial value formula Sj and the incremental value δj.

Japanese Patent Application Publication No. 2007-511835 discloses that a network processor is configured into a D-stage processor pipeline, a sequential network application program is transformed into D-pipeline stages, and the D-pipeline stages are executed in parallel within the D-stage processor pipeline. In the transformation of a sequential application program, for example, the sequential network program is modeled as a flow network model and multiple preliminary pipeline stages are selected from the flow network model.

These conventional techniques, however, suggest no technique for enhancing parallelization in one iteration for functional blocks having loop carried dependence.

Hence, the inventors of the present application proposed a technique for enhancing parallelization in one iteration for functional blocks, in the specification of commonly owned Japanese Patent Application No. 2009-251044, "Parallelization Method, System and Program." Note that a set of functional blocks executed in parallel is referred to as a strand in the specification of commonly owned Japanese Patent Application No. 2009-251044 and thus the term is used herein in the same meaning.

The technique described in the specification of commonly owned Japanese Patent Application No. 2009-251044 has enhanced the parallelization. However, since the algorithm described therein does not necessarily take the sizes of generated strands into consideration, a balance in calculation time among strands is lost. In this case, a strand involving the maximum calculation time influences the total parallel processing time, and thus prevents speeding up of the processing.

BRIEF SUMMARY OF THE INVENTION

To overcome these deficiencies, the present invention provides a method of parallelizing codes by processing of a computer, wherein the codes are configured by connecting blocks with internal state and blocks without internal state, the method including: creating a graph expression in which nodes represent the blocks and edges represent links between the blocks, and then storing the graph expression in a memory of the computer; grouping the blocks into a plurality of strands by tracing the graph expression in such a manner that every path between the input and output of each of the strands includes at least one of the blocks with internal state; selecting a strand having a maximum calculation time from all the strands; specifying, based on a parent-child relationship among the blocks with internal state and the blocks without internal state, a movable block without internal state in the selected strand having the maximum calculation time; and moving the movable block to an adjacent strand if the calculation time of the strand having the maximum calculation time is shorter after movement of the movable block to the adjacent strand than the calculation time before the movement.

According to another aspect of the present invention, the present invention provides a computer program product for parallelizing codes by processing of a computer, the codes configured by connecting blocks with internal state and blocks without internal state, the computer program product including: a computer readable storage medium having computer readable program code embodied therewith, the computer readable program code including computer readable program code configured for: creating a graph expression in which nodes represent the blocks and edges represent links between the blocks, and then storing the graph expression in a memory of the computer; grouping the blocks into a plurality of strands by tracing the graph expression in such a manner that every path between the input and output of each of the strands includes at least one of the blocks with internal state; selecting a strand having a maximum calculation time from all the strands; specifying, based on a parent-child relationship among the blocks with internal state and the blocks without internal state, a movable block without internal state in the selected strand having the maximum calculation time; and moving the movable block to an adjacent strand if the calculation time of the strand having the maximum calculation time is shorter after movement of the movable block to the adjacent strand than the calculation time before the movement.

According to yet another aspect of the present invention, the present invention provides a system for parallelizing codes by processing of a computer, the codes configured by connecting blocks with internal state and blocks without internal state, the system including: a memory; means for creating a graph expression in which nodes represent the blocks and edges represent links between the blocks, and then storing the graph expression in the memory of the computer; means for grouping the blocks into a plurality of strands by tracing the graph expression in such a manner that every path between the input and output of each of the strands includes at least one of the blocks with internal state; means for selecting a strand having a maximum calculation time from all the strands; means for specifying, based on a parent-child relationship among the blocks with internal state and the blocks without internal state, a movable block without internal state in the selected strand having the maximum calculation time; and means for moving the movable block to an adjacent strand if the calculation time of the strand having the maximum calculation time is shorter after movement of the movable block to the adjacent strand than the calculation time before the movement.

BRIEF DESCRIPTION OF THE SEVERAL VIEWS OF THE DRAWINGS

For a more complete understanding of the present invention and the advantage thereof, reference is now made to the following descriptions taken in conjunction with the accompanying drawings.

FIG. 12 is a table showing rules of processing of forming a strand.

FIGS. 19(1) and 19(2) are diagrams showing an example of processing of separating a strand.

DETAILED DESCRIPTION OF THE PREFERRED EMBODIMENTS

Figure 1:
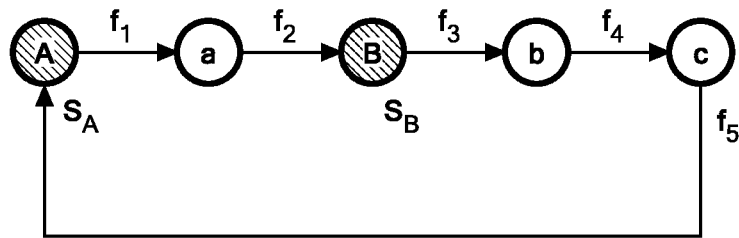
FIG. 1 is a diagram showing an example of a block diagram of a loop formed by functional blocks with internal state and functional blocks without internal state.
Figure 2:
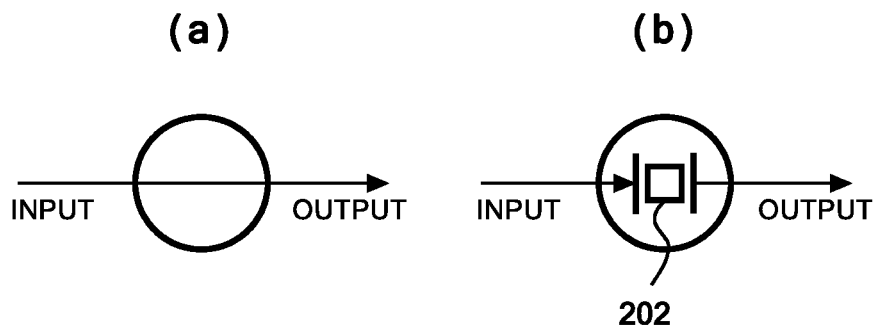
FIGS. 2A and 2B are diagrams respectively show mechanisms of a functional block with internal state and a functional block without internal state.
Figure 3:
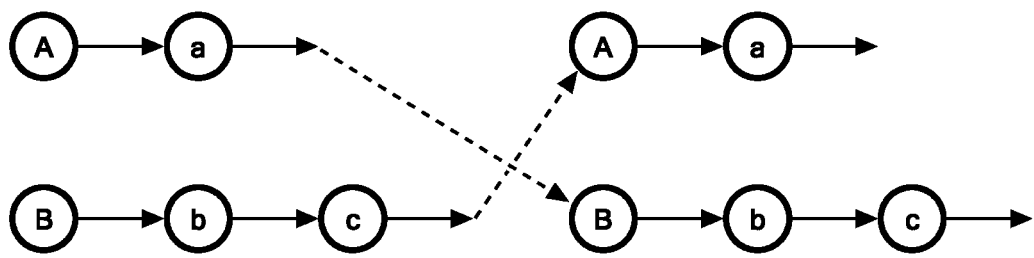
FIG. 3 is a diagram showing an example of parallelization in a block diagram.

A configuration and processing according to an embodiment of the present invention will be described below by reference to the accompanying drawings. In the following description, the same components are denoted by the same reference numerals throughout the drawings unless otherwise noted. In addition, the following configuration and the processing are described merely as an embodiment. Thus, it is to be understood that the technical scope of the present invention is not intended to be limited to this embodiment.

Figure 4:
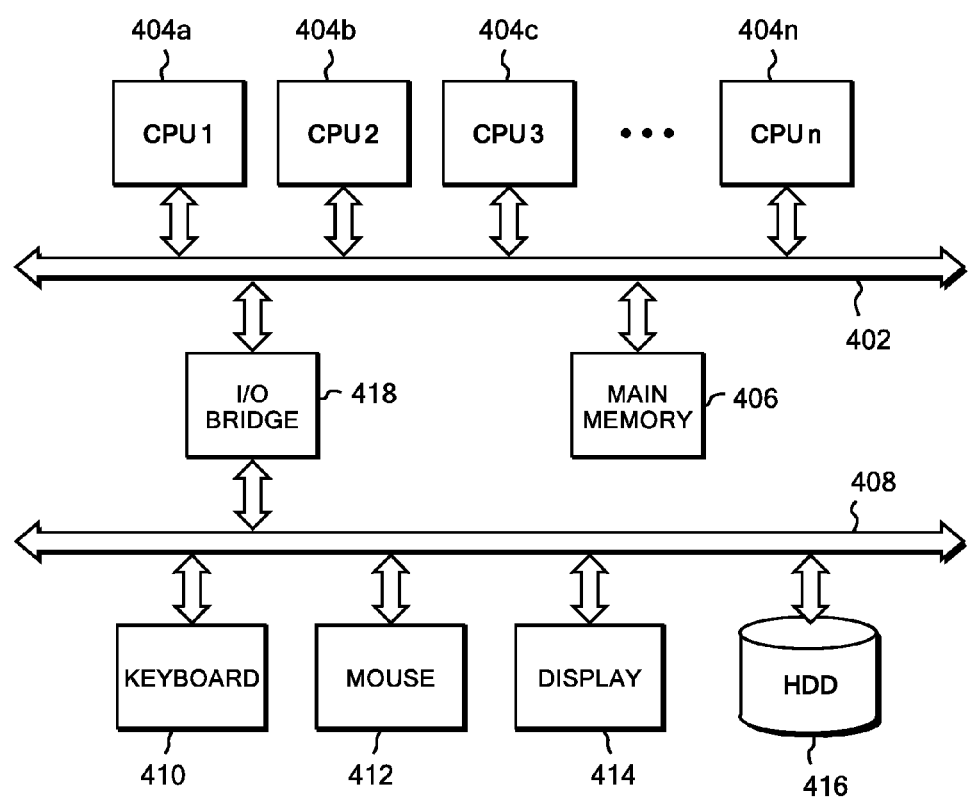
FIG. 4 is a block diagram of hardware for implementing the present invention.

First of all, computer hardware used for implementing the present invention will be described by referring to FIG. 4. In FIG. 4, multiple CPUs, CPU1 404a, CPU2 404b, CPU3 404c, ..., CPUn 404n are connected to a host bus 402. To the host bus 402, a main memory 406 for computing of the CPU1 404a, CPU2 404b, CPU3 404c, ..., CPUn 404n is further connected.

Meanwhile, to an I/O bus 408, a keyboard 410, a mouse 412, a display 414 and a hard disk drive 416 are connected. The I/O bus 408 is connected to the host bus 402 through an I/O bridge 418. The keyboard 410 and the mouse 412 are used by the operator for operations. For example, the operator inputs a command by using the keyboard 410, or clicks on a menu by using the mouse 412. The display 414 is used to display a menu for operating a program, according to the present invention, to be described later, through a GUI, when necessary.

IBM® System X® is a computer system hardware which can be used for the purpose of implementing the present invention. When the IBM® System x® is used, the CPU1 404a, CPU2 404b, CPU3 404c, ..., CPUn 404n are each Intel® Xeon®, for example, and the operating system is Windows Server 2003™. The operating system is stored in the hard disk drive 416, and is loaded into the main memory 406 from the hard disk drive 416 at the time of starting the computer system.

It is necessary to use a multiprocessor system in order to implement the present invention. The multiprocessor system is generally intended to be a system using a processor having multiple cores each functioning as a processor which can perform computing independently. Thus, it should be understood that any of a multi-core single-processor system, a single-core multiprocessor system and a multi-core multiprocessor system can be used.

Here, the computer system hardware which can be used for implementing the present invention is not limited to IBM® System X®, and any computer system as long as it is capable of running a simulation program of the present invention can be used. In addition, the operating system is not limited to Windows®, and any operating system such as Linux® or Mac OS® can be used. Moreover, in order to execute the program at a high speed, a computer system such as IBM® System X® using AIX®, as the operating system, based on POWER6® can be used.

In an embodiment, the hard disk drive 416 further stores MATLAB®/Simulink®, a C compiler or a C++ compiler, modules for analyzing source codes and forming strands according to the present invention, which will be described later, a module for generating codes for CPU assignment, and the like. These are each loaded into and thereby executed by the main memory 406 in response to a keyboard operation or a mouse operation by the operator.

Here, the usable simulation modeling tool is not limited to MATLAB®/Simulink®, and any simulation modeling tool such as an open-source Scilab/Scicos can be used, for example.

Alternatively, in some cases, source codes for the simulation system can be directly written in C or C++ without using any simulation modeling tool. The present invention is also applicable to such cases, if individual functions can be described as separate functional blocks in a mutually dependant relationship.

Figure 5:
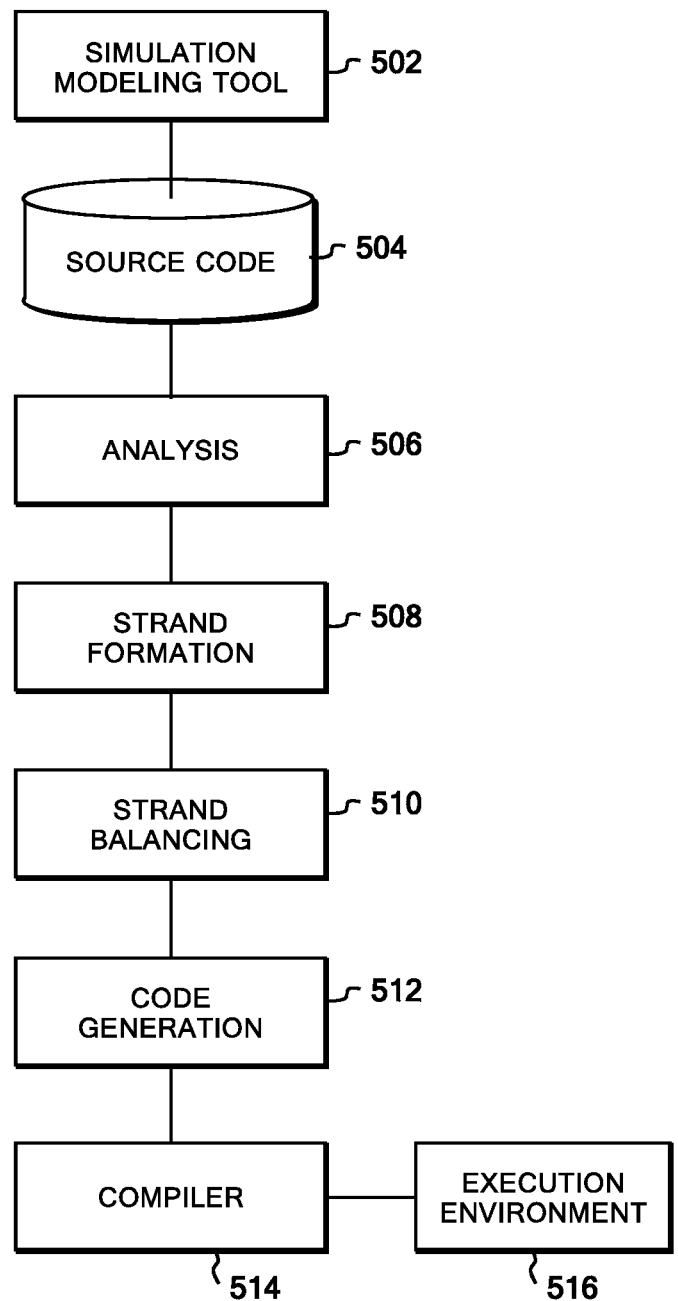
FIG. 5 is a functional block diagram for implementing the present invention.

FIG. 5 is a functional block diagram according to the embodiment of the present invention. In general, each block corresponds to a module stored in the hard disk drive 416.

In FIG. 5, a simulation modeling tool 502 can use any existing modeling tool such as MATLAB®/Simulink® and Scilab/Scicos. The simulation modeling tool 502 basically has such a function that enables an operator to arrange functional blocks on the display 414 through a GUI, to describe necessary attributes such as a mathematical formula, and to describe a block diagram by associating the functional blocks with each other as necessary. The simulation modeling tool 502 further has a function of outputting C source codes describing functions equivalent to the described block diagram. The simulation modeling tool 502 can use C++, FORTRAN or the like as well as C, and particularly can generate an MDL file (Simulink® model file) to describe dependence among the functional blocks, because the MDL file has a format unique to Simulink®.

Note that the simulation modeling tool may also be loaded onto another computer, so that a source code generated there can be downloaded to the hard disk drive 416 via a network or the like.

A source code 504 thus outputted is stored in the hard disk drive 416. Note that an MDL file for describing the dependence among the functional blocks can be stored in addition to the source code 504.

An analyzing module 506 receives the source code 504 to analyze the code structure, and then expresses the relationship among the blocks by a graph. Data of the graph expression is preferably stored in the hard disk drive 416. Since the data structure of the graph expression on the computer is well known, a description thereof is omitted here.

A strand forming module 508 reads the graph expression created by the analyzing module 506, determines a definer block with internal state and a user block with internal state in association with functional blocks without internal state, and then forms a strand set based on information thereof. Detailed processing of the strand forming module 508 will be described later.

A strand balancing module 510 performs processing of alleviating imbalance in calculation time required for the strands in the strand set created by the strand forming module 508. The processing by the strand balancing module 510 will be described later in detail by referring to a flowchart in FIG. 6 and the like.

A code generating module 512 generates source codes to be compiled by a compiler 514 on the basis of information generated by the strand balancing module 510. As a programming language conceivable by the compiler 514, any programming language can be used which makes possible programming for multi-cores or multiprocessors, including C, C++, C#, Java® or the like. The code generating module 512 generates a source code for each strand for the multi-cores or multiprocessors.

Each of executable binary codes (not shown) generated by the compiler 514 is assigned to one of the cores or processors preferably on a strand basis, and executed in an execution environment 516 by an operation of an operating system.

Figure 6:
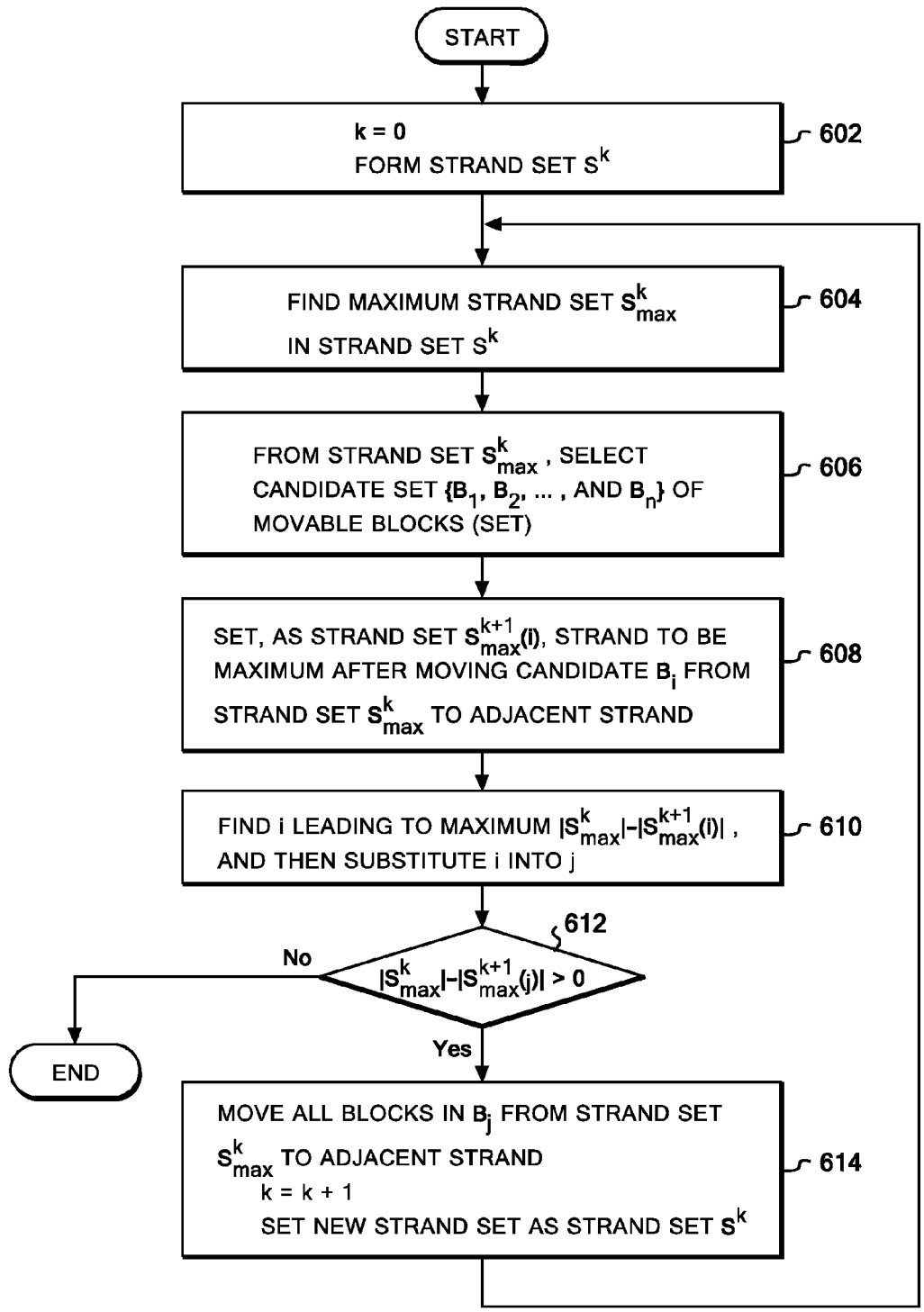
FIG. 6 is an outline flowchart of overall processing of the present invention.

Next, by referring to the flowchart in FIG. 6 and the figures that follow, a description is given of processing by the strand balancing module 510. In Step 602 in FIG. 6, the strand forming module 508 performs processing of forming a strand set $S^k$ in a graph expression of a block diagram. That is, $S^k$ is a k-th formed strand set, and k starts from 0 and is incremented by 1 every time the processing loop in FIG. 6 is performed.

Note that, in an algorithm of forming a strand set $S^k$, a graph is divided in such a manner that a path not including a block with internal state (hereinafter, also referred to as an SB) does not exist on a path between input and output in a strand (the strand condition is satisfied). An algorithm to form a strand set $S^k$ is described in the specification of Japanese Patent Application 2009-251044, although not limited thereto. The algorithm is also described herein by referring to FIG. 8 and following figures.

Here, definitions are given to an input-side block and an output-side block, for a description to be given later.

Firstly, a block without internal state (hereinafter, also referred to as an SLB) is always located on either the input side or the output side of an SB in the strand including the SLB.

An SLB on the input side means an SLB which reaches an SB while children thereof are traced sequentially in the same strand.

An SLB on the output side means a SLB which reaches an SB while parents thereof are traced sequentially in the same strand.

Figure 7:
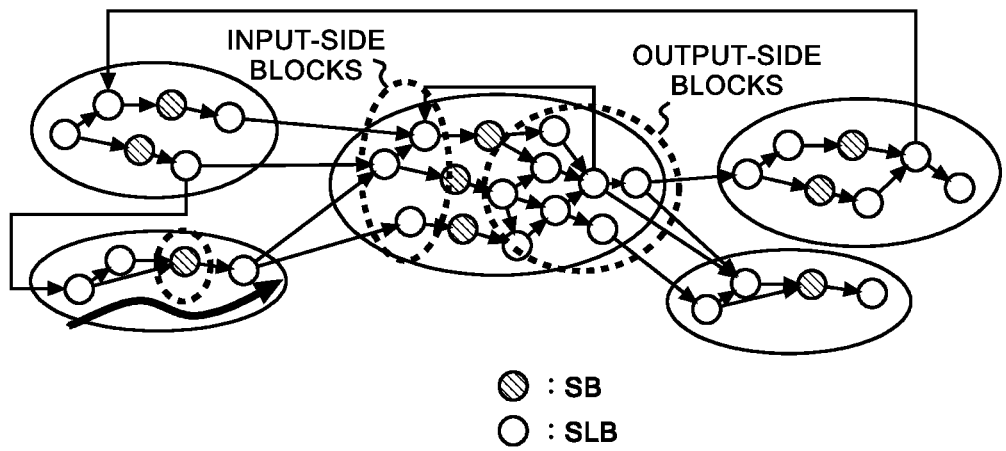
FIG. 7 is a diagram showing an example of input-side blocks and output-side blocks.

A parent-child relationship of blocks is defined as follows. As indicated by "(parent)→(child)," a block as a start point of the arrow is a parent, while a block as a destination of the arrow is a child. FIG. 7 shows an example of such input-side blocks and output-side blocks.

An SLB in a loop structure could be located on either side, but is uniquely determined based on the algorithm of the strand forming module 508.

In Step 604, the strand balancing module 510 finds a maximum strand $s^k_{max}$ in the strand set $S^k$. "Maximum" means that a total estimated calculation amount of blocks included in a strand is the maximum in a strand set including the strand. The maximum strand is the strand that has the maximum calculation time among strands in the strand set. Since many blocks each involve a constant execution time for its processing, it is possible to estimate total execution time in advance by, for example, measuring the time or setting appropriate weightings based on the type of computing (such as an arithmetical operation or logical operation) included in the blocks and the number of blocks.

In Step 606, the strand balancing module 510 selects a candidate set $\{B1, B2, \ldots, Bn\}$ of blocks to be moved from the maximum strand $s^k_{max}$. This processing will be described later in detail by referring to flowcharts in FIGS. 15 and 16.

In Step 608, the strand balancing module 510 sets, as a maximum strand $s^{k+1}_{max}(i)$, a maximum strand to be formed after moving a movable block candidate Bi (i=1, ..., n) to an adjacent strand. As understood by referring to FIG. 7, which adjacent strand the movable block candidate Bi (i=1, ..., n) should be moved to is determined based on a connection relationship with a corresponding block in the adjacent strand.

In Step 610, the strand balancing module 510 finds such i that leads to the maximum $|s^k_{max}|-|s^{k+1}_{max}(i)|$, and then i is substituted into j. Note that such a notation as $|s|$ represents calculation time of s.

In step 612, the strand balancing module 510 determines whether or not $|s^k_{max}|-|s^{k+1}_{max}(i)|>0$.

Determining $|s^k_{max}|-|s^{k+1}_{max}(j)|>0$ means that there is room for more optimum block moving. When determining $|s^k_{max}|-|s^{k+1}_{max}|>0$, the strand balancing module 510 proceeds to Step 614 to perform processing of moving all the blocks in the movable block candidate Bj to a corresponding adjacent strand. In Step 614, k is incremented by only 1, and a new strand set is set as a strand set Sk.

The strand balancing module 510 returns to Step 604, and again finds a maximum strand.

Again in Step 612, determining that $|s^k_{max}|-|s^{k+1}_{max}|>0$ is false means that there is no room for more optimum block moving. When determining that $|s^k_{max}|-|s^{k+1}_{max}(j)|>0$ is false, the strand balancing module 510 terminates the processing.

Figure 8:
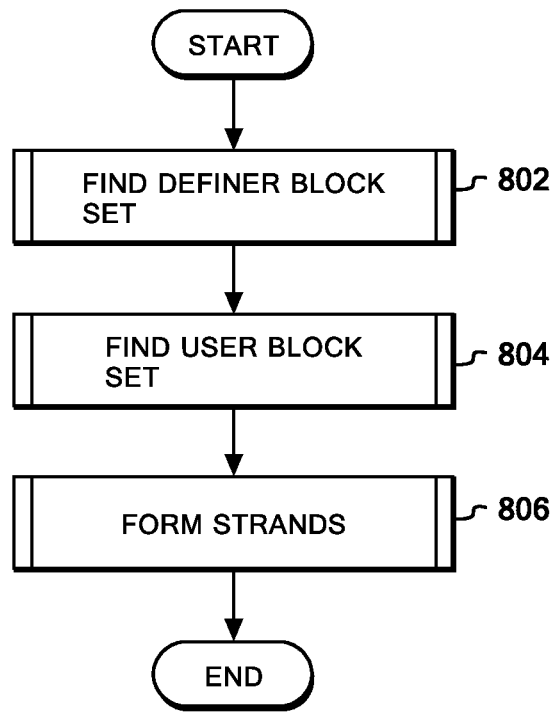
FIG. 8 is a flowchart of processing of forming a strand set.

Next, by referring to FIG. 8 and the following figures, a description is given of a function of forming a strand set by the strand forming module 508 in Step 602 of FIG. 6. Here, a definer block and a user block are defined, respectively.

Specifically, when output of a certain functional block without internal state is used by a functional block A with internal state, regardless of being directly or indirectly, in a state where no other block with internal state is located therebetween, the functional block A is referred to as a user block of the certain functional block without internal state, and constitutes a set of user blocks of the functional block without internal state.

When output of a functional block A with internal state is used as input to a certain functional block without internal state, regardless of being directly or indirectly, in a state where no other block with internal state is located therebetween, the functional block A is referred to as a definer block of the certain functional block without internal state, and constitutes a set of definer blocks.

In Step 802 in FIG. 8, the strand forming module 508 performs processing of finding a definer block in a graph expression of a block diagram. The processing will be described later in more detail by referring to a flowchart in FIG. 9.

In Step 804, the strand forming module 508 performs processing of finding a definer block in a graph expression of a block diagram. The processing will be described later in more detail by referring to a flowchart in FIG. 10.

Figure 9:
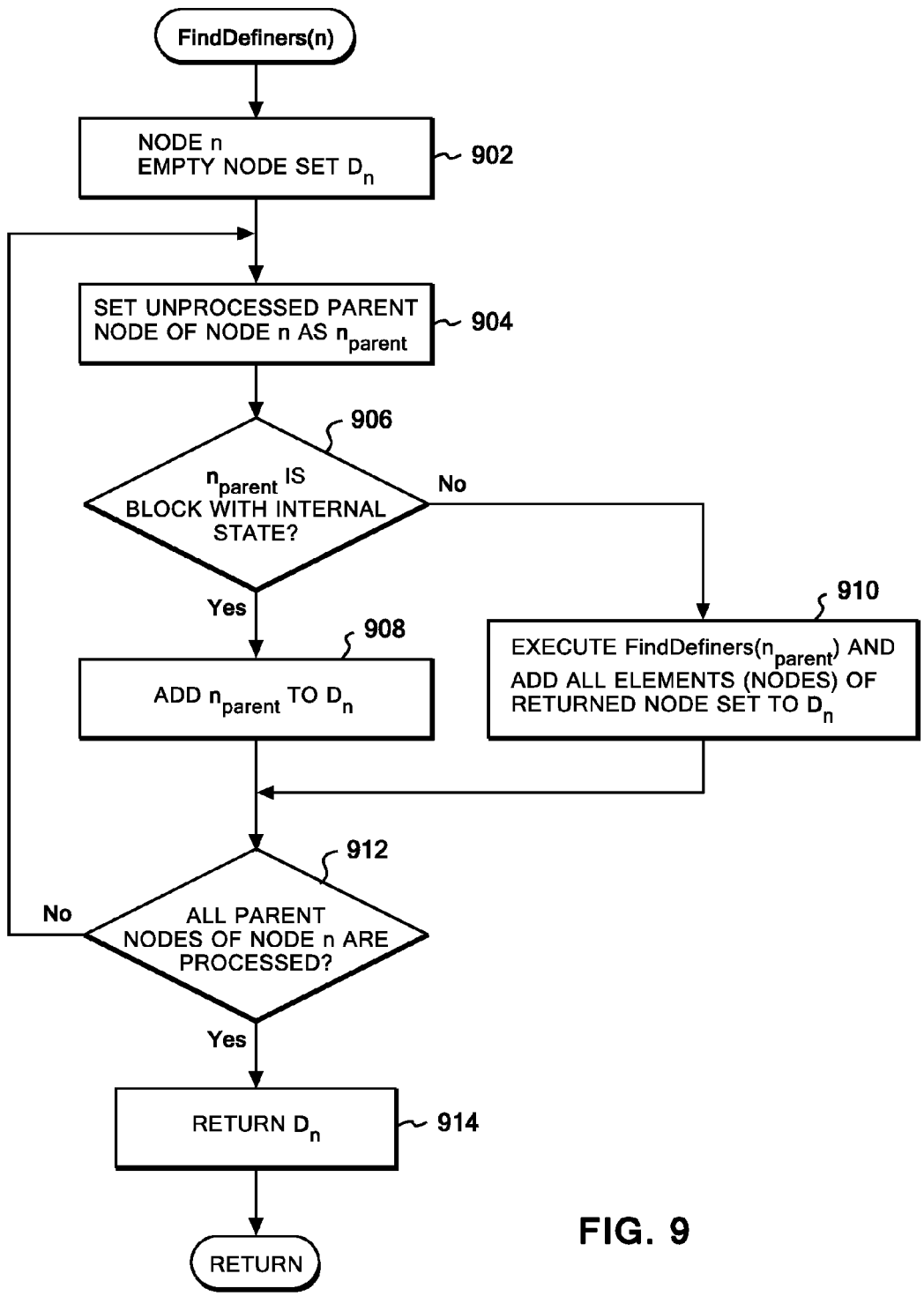
FIG. 9 is a flowchart of processing of finding a definer block set.

FIG. 9 is the flowchart showing the processing of FindDefiners(n) in which a definer block is found for a node (functional block) n. In Step 902 in FIG. 9, an empty node set $D_n$ is prepared for the node n.

In Step 904, one of the unprocessed parent nodes of the node n is set as a node $n_{parent}$.

In Step 906, it is determined whether or not the node $n_{parent}$ is a block with internal state. If the node $n_{parent}$ is a block with internal state, the node $n_{parent}$ is added to the node set $D_n$ in Step 908.

If it is determined that the node $n_{parent}$ is not a block with internal state in Step 906, FindDefiners($n_{parent}$) is recursively called and all the elements in the returned node set are added to the node set $D_n$ in Step 910.

Next, each of the processes in Step 908 and Step 910 proceeds to Step 912, and it is determined whether or not all the parent nodes of the node n are processed. If all the parent nodes of the node n are not processed, the processing returns to Step 904.

If it is determined in Step 912 that all the parent nodes of the node n are processed, in Step 914 the node set $D_n$ is returned. Then, the processing of FindDefiners(n) is terminated.

In Step 802 in FIG. 8, the strand forming module 508 sequentially visits all the nodes in the graph of the block diagram. If the node n is a block without internal state, the strand forming module 508 applies FindDefiners(n) in FIG. 9 to the node n, and obtains a returned node set $D_n$ as a definer block set of the node n. On the other hand, if the node n is a block with internal state, the strand forming module 508 adds the node n to the empty node set $D_n$ to form the definer block set. The strand forming module 508 stores, preferably in the main memory 406, the definer block set $D_n$ obtained by looping the processing for the node n and correspondences therebetween.

Figure 10:
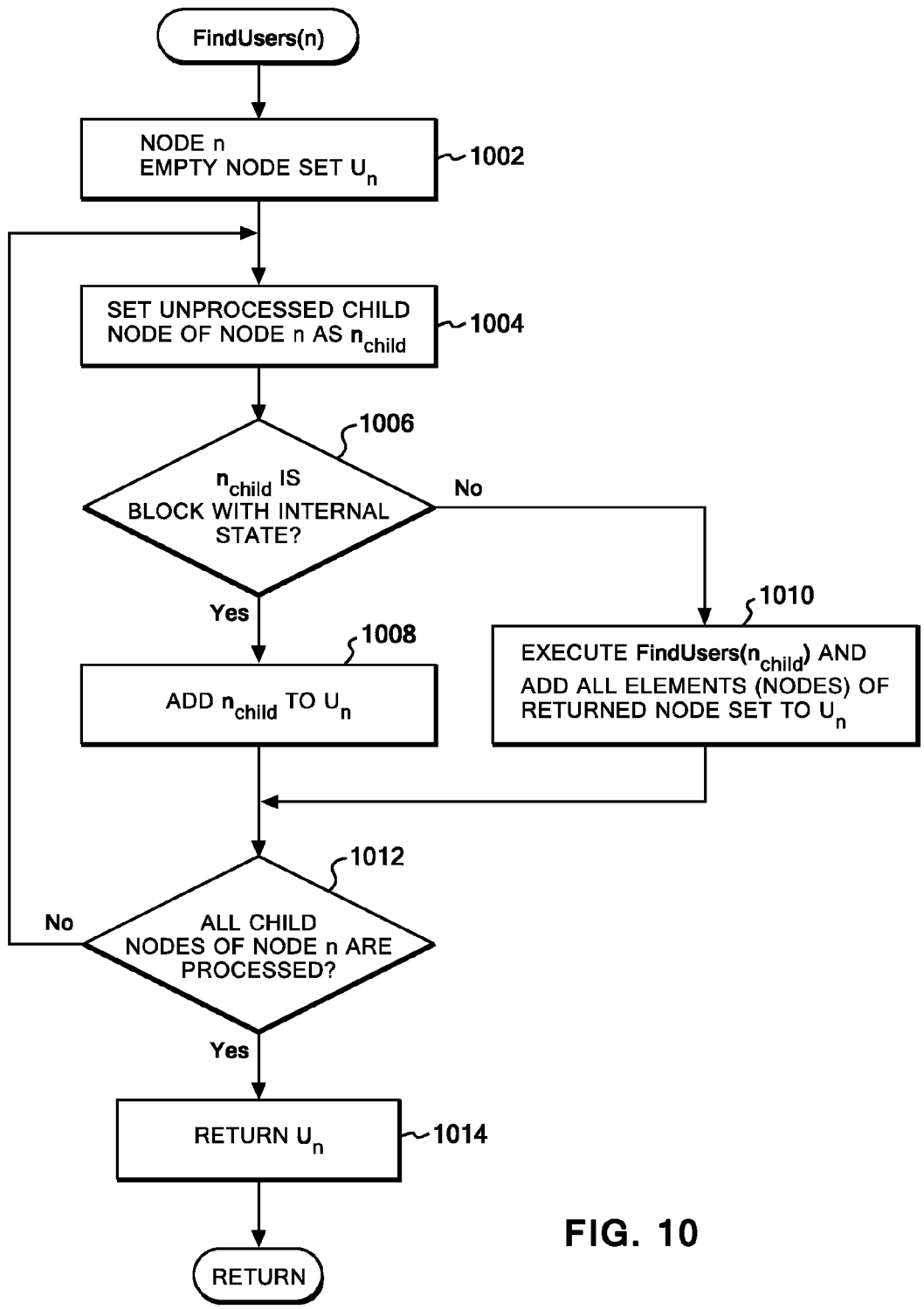
FIG. 10 is a flowchart of processing of finding a user block set.

FIG. 10 is the flowchart showing the processing of FindUsers(n) in which a user block is found for a node (functional block) n. In Step 1002 in FIG. 10, an empty node set Un is prepared for the node n.

In Step 1004, one of the unprocessed child nodes of the node n is set as a node $n_{child}$.

In Step 1006, it is determined whether or not the node $n_{child}$ is a block with internal state. If the node $n_{child}$ is a block with internal state, the node nchild is added to the node set $U_n$ in Step 1008.

If it is determined that the node $n_{child}$ is a block without internal state in Step 1006, FindUsers($n_{child}$) is recursively called and all the elements in the returned node set are added to the node set $U_n$ in Step 1010.

Next, each of the processes in Step 1008 and Step 1010 proceeds to Step 1012, and it is determined whether or not all the child nodes of the node n are processed. If all the child nodes of the node n are not processed, the processing returns to Step 1004.

If it is determined in Step 1012 that all the child nodes of the node n are processed, in Step 1014 the node set Un is returned. Then the processing of FindUsers(n) is terminated.

In Step 804 in FIG. 8, the strand forming module 508 sequentially visits all the nodes in the graph of the block diagram. If the node n is a block without internal state, the strand forming module 508 applies FindUsers(n) in FIG. 10 to the node n. In addition, the strand forming module 508 stores, preferably in the main memory 406, the content of the node set $U_n$ and information on link thereto by associating the returned node set Un as a user block set with the node n. On the other hand, if the node n is a block with internal state, the strand forming module 508 adds the node n to the empty node set $U_n$ thereof to form the user block set. The strand forming module 508 stores, preferably in the main memory 406, the user block set $U_n$ obtained by looping the processing for the node n and correspondences therebetween.

Figure 11:
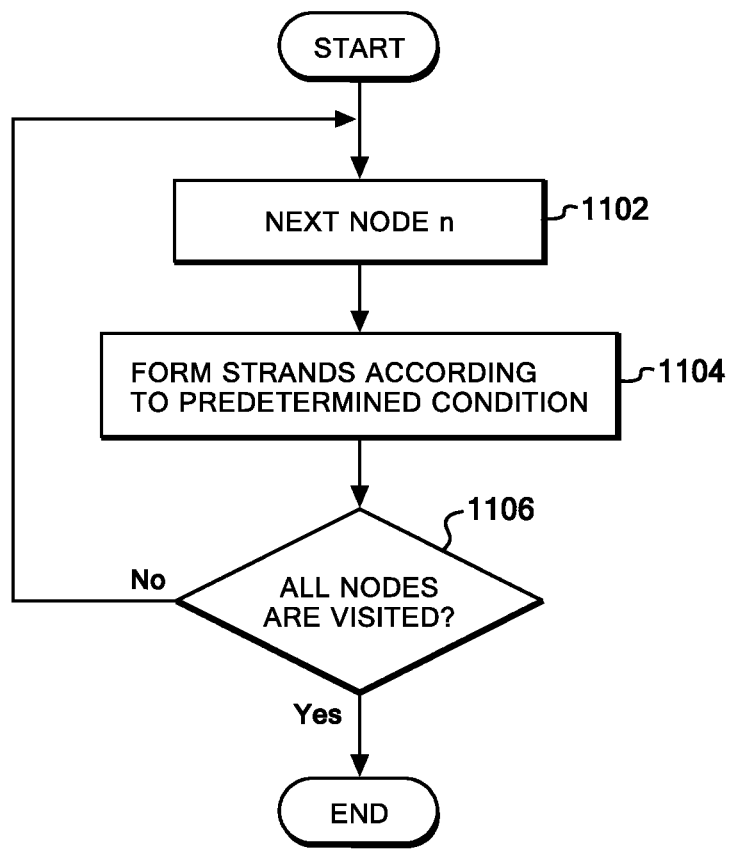
FIG. 11 is a flowchart of processing of forming individual strands.

Next, by referring to a flowchart in FIG. 11, a description is given of processing of forming strands. The processing corresponds to Step 806 in FIG. 8. It should be understood that, at the time of executing the processing in the flowchart in FIG. 11, the node n has been associated with the definer block set $D_n$ and the user block set $U_n$ in Steps 802 and 804.

In Step 1102 in FIG. 11, the strand forming module 508 visits a next node n in the graph expression of the block diagram. At this time, the order of visiting nodes is not particularly specified, and any node n can be selected in the first step.

Then, the strand forming module 508 proceeds to Step 1104, and performs the processing of forming strands in accordance with rules to use information on the block set $D_n$ and the node set $U_n$.

FIG. 12 shows the rules or conditions. As shown therein, processes as described below are performed depending on the number of user blocks which is the number of node set $U_n$ elements and the number of definer blocks which is the number of block set $D_n$ elements.

(1) when the number of user blocks=0 and the number of definer blocks=0, a functional block satisfying the condition is assigned to an adjacent strand including a block satisfying the number of user blocks=0 and the number of definer blocks=0;

(2) when the number of user blocks=0 and the number of definer blocks=1, a functional block satisfying the condition is assigned to an adjacent strand including a block satisfying the number of user blocks=0;

(3) when the number of user blocks=0 and the number of definer blocks>1, a functional block satisfying the condition is assigned to an adjacent strand including a block satisfying the number of user blocks=0;

(4) when the number of user blocks=1 and the number of definer blocks=0, a functional block satisfying the condition is assigned to an adjacent strand including a block satisfying the number of definer blocks=0;

(5) when the number of user blocks=1 and the number of definer blocks=1, a functional block satisfying the condition is assigned to a strand including the definer block;

(6) when the number of user blocks=1 and the number of definer blocks>1, a functional block satisfying the condition is assigned to a strand including the user block;

(7) when the number of user blocks>1 and the number of definer blocks=0, a functional block satisfying the condition is assigned to an adjacent strand including a block satisfying the number of definer blocks=0;

(8) when the number of user blocks>1 and the number of definer blocks=1, a functional block satisfying the condition is assigned to a strand including the definer block; and (9) when the number of user blocks>1 and the number of definer blocks>1, a functional block satisfying the condition is redundantly assigned to strands including the user blocks in the user block set.

Such multiple conditions can be described, for example, in the following statement or the like.

```
if (the number of definer blocks == 0 &&
    the number of user blocks == 0){
    processing;
} else if (the number of definer blocks == 1 &&
    the number of user blocks == 0){
    processing;
}
...
```

When the node n is assigned to a strand as described above in Step 1104, in Step 1106 it is determined whether or not the strand forming module 508 has visited all the nodes. If the strand forming module 508 has visited all the nodes, the processing is terminated. If the strand forming module 508 has not visited all the nodes, the processing returns to Step 1102.

The sizes of multiple strands thus formed are balanced in calculation time thereof by the strand balancing module 510, compiled by the compiler 514, and then preferably assigned to CPU1 to CPUn to be executed in parallel in the execution environment 516.

Figure 13:
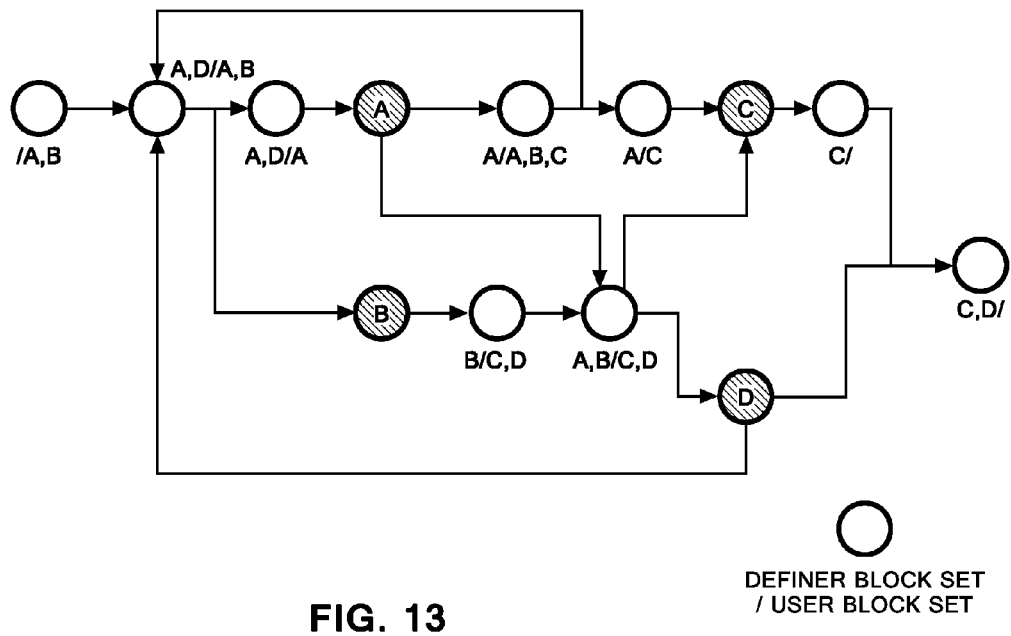
FIG. 13 is a diagram showing an example of finding definer block sets and user block sets in a graph of a block diagram.

FIG. 13 is a diagram showing a result of application of Steps 802 and 804 to a certain block diagram. In FIG. 13, hatched blocks denoted by A, B, C, D and so on are blocks with internal state, white blocks are blocks without internal state.

As the result of application of Steps 802 and 804, correspondence with 0 or more blocks with internal states as a definer block set/a user block set is calculated for each block with internal state.

Figure 14:
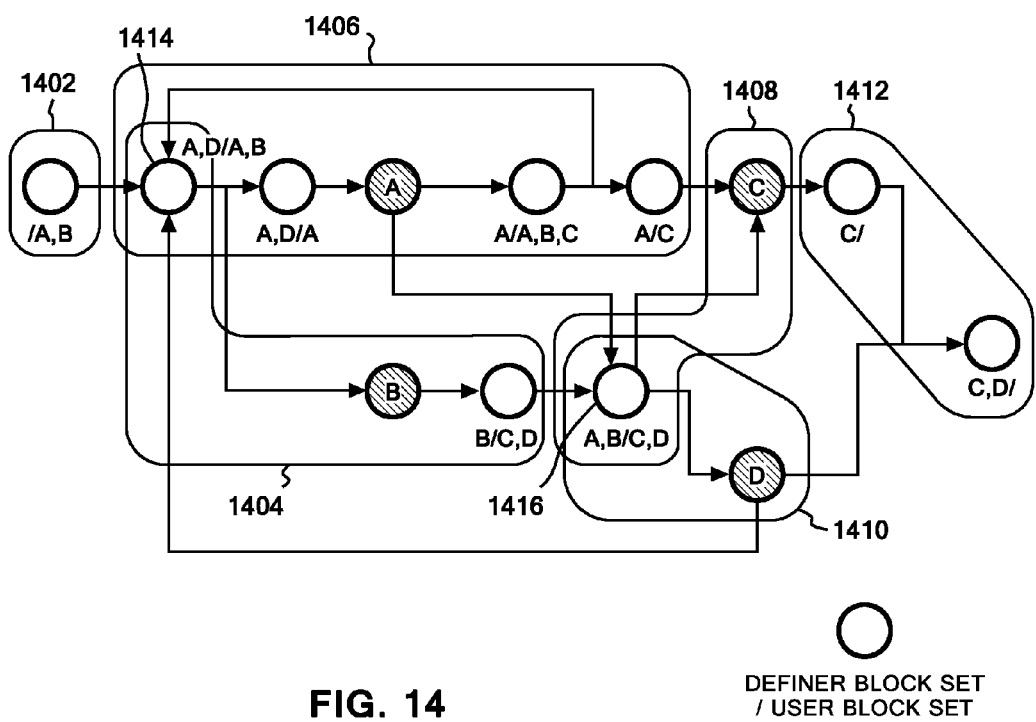
FIG. 14 is a diagram showing a result of processing of forming strands based on found definer block sets and user block sets.

Then, strands 1402, 1404, 1406, 1408, 1410 and 1412 as described in FIG. 14 are formed by applying Step 806, that is, the processing in the flowchart in FIG. 11 to the graph of the block diagram in FIG. 13. It should be noted that, particularly when multiple blocks exist in each of a definer block set and a user block set such as definer blocks/user blocks=A, D/A, B and definer blocks/user blocks=A, B/C, B, the blocks therein are each shared with the multiple strands. For example, there are cases where a block 1414 is shared with the strands 1404 and 1406, and a block 1416 is shared with the strands 1408 and 1410, and the like.

Figure 15:
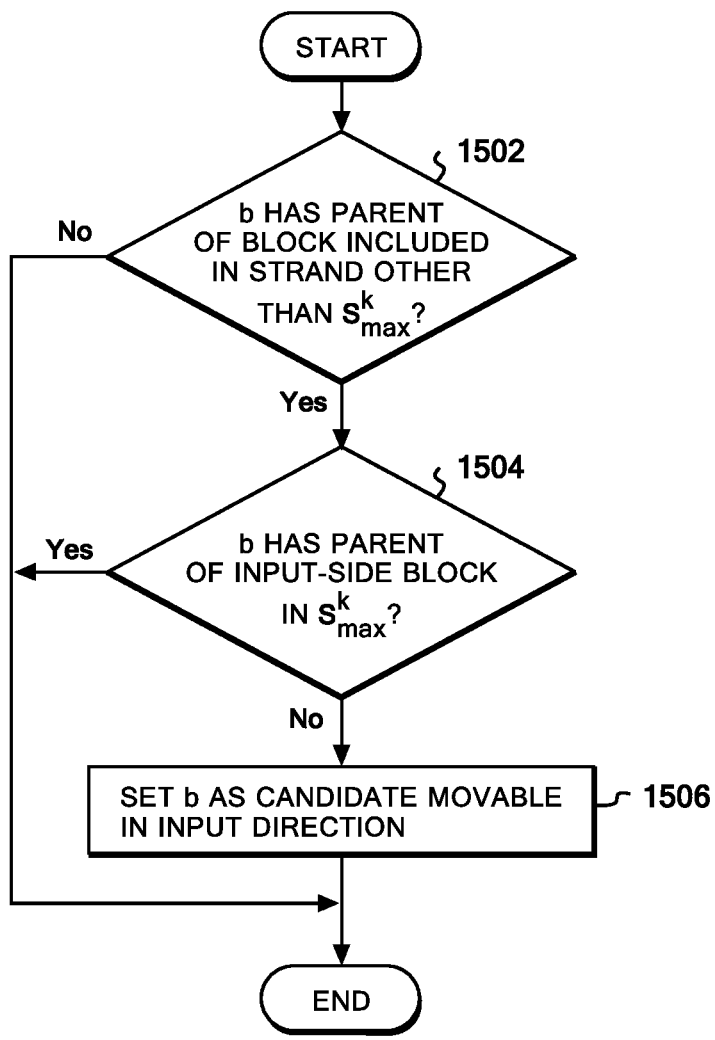
FIG. 15 is a flowchart of processing of finding a candidate block movable in an input direction.
Figure 16:
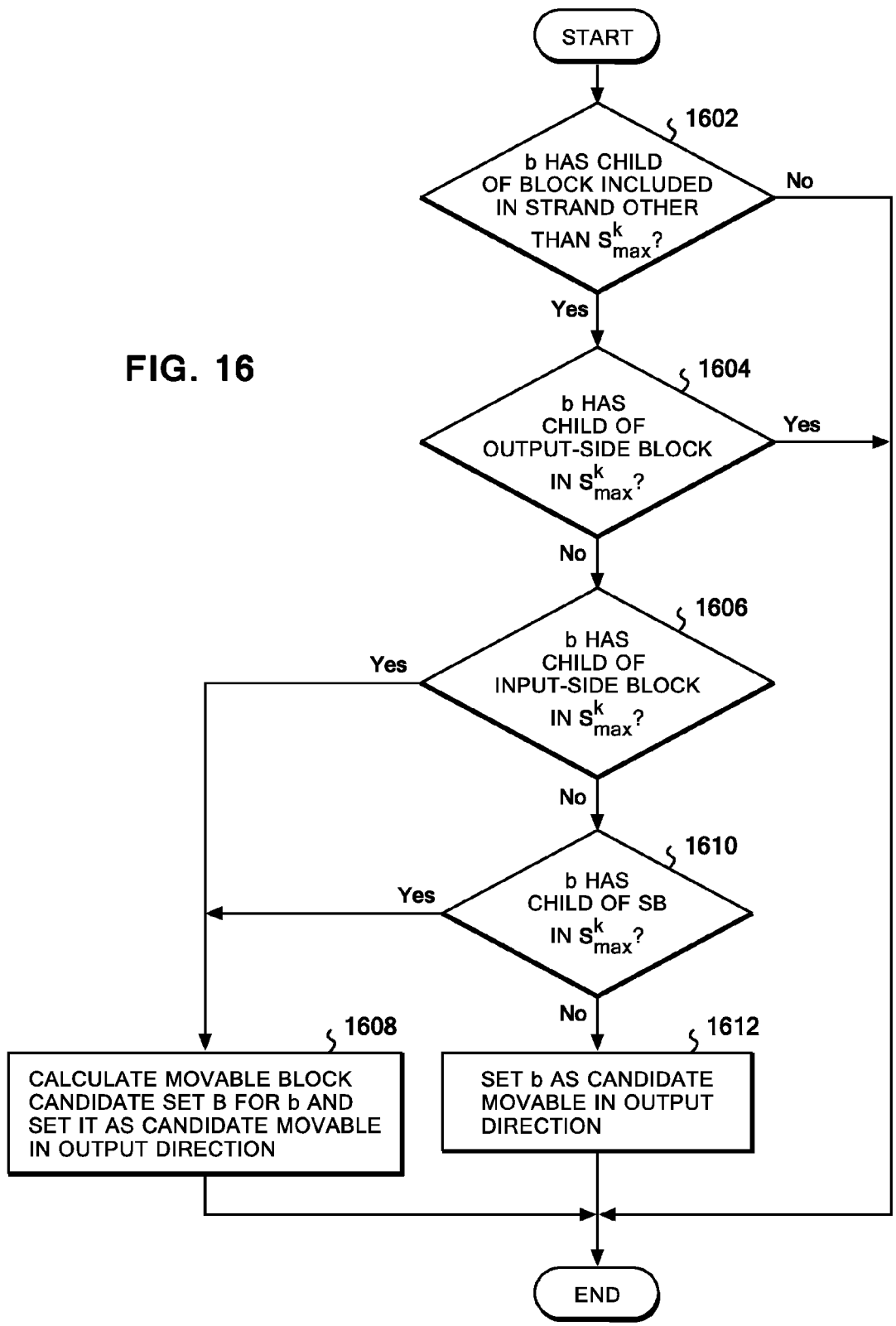
FIG. 16 is a flowchart of processing of finding a candidate block movable in an output direction.

Next, by referring to the flowcharts in FIGS. 15 and 16, a description is given of the processing of selecting a block to be moved shown by Step 606 in FIG. 6. Note that the processes in FIGS. 15 and 16 are executed for each SLB in the maximum strand, while b is set for the SLB.

In Step 1502 in FIG. 15, the strand balancing module 510 determines whether or not a block b has a parent in a strand other than a maximum strand $s^k_{max}$. If the block b does not have a parent in a strand other than a maximum strand $s^k_{max}$, the processing is terminated immediately.

If the determination result is affirmative in Step 1502, the strand balancing module 510 proceeds to Step 1504, and determines whether or not the block b has a parent of an input-side block in the maximum strand $s^k_{max}$. If the block b has a parent of an input-side block in the maximum strand $s^k_{max}$, the processing is terminated immediately.

If the determination result is negative in Step 1504, the strand balancing module 510 sets the block b as a candidate movable in the input direction in Step 1506.

In Step 1602 in FIG. 16, the strand balancing module 510 determines whether or not the block b has a child of a block in strands other than the maximum strand $s^k_{max}$. If the block b does not have a child of a block in strands other than the maximum strand $s^k_{max}$, the processing is terminated immediately.

If the determination result is affirmative in Step 1602, the strand balancing module 510 proceeds to Step 1604, and determines whether or not the block b has a child of an output-side block in the maximum strand $s^k_{max}$. If the block b has a child of an output-side block in the maximum strand $s^k_{max}$, the processing is terminated immediately.

If the determination result is negative in Step 1604, the strand balancing module 510 proceeds to Step 1606, and determines whether or not the block b has a child of an input-side block in the maximum strand $s^k_{max}$. If the block b has a child of an input-side block in the maximum strand $s^k_{max}$, the strand balancing module 510 proceeds to Step 1608, calculates a movable block candidate set B for the block b to be set as candidates movable in an output direction. Step 1608 will be described later in more detail by referring to a flowchart in FIG. 18. After Step 1608, the processing is terminated.

Referring back to Step 1606, if the determination result is negative in Step 1606, in Step 1610 the strand balancing module 510 determines whether or not the block b has a child of an SB in the maximum strand $s^k_{max}$. If the block b has a child of an SB in the maximum strand $s^k_{max}$, the processing proceeds to Step 1608.

If the determination result is negative in Step 1610, the strand balancing module 510 proceeds to Step 1612, and sets the block b as a candidate movable in the output direction. Then the processing is terminated.

In order to determine a movable block candidate, the strand balancing module 510 executes the processes in the flowcharts in FIGS. 15 and 16 for each SLB in the maximum strand.

Figure 17:
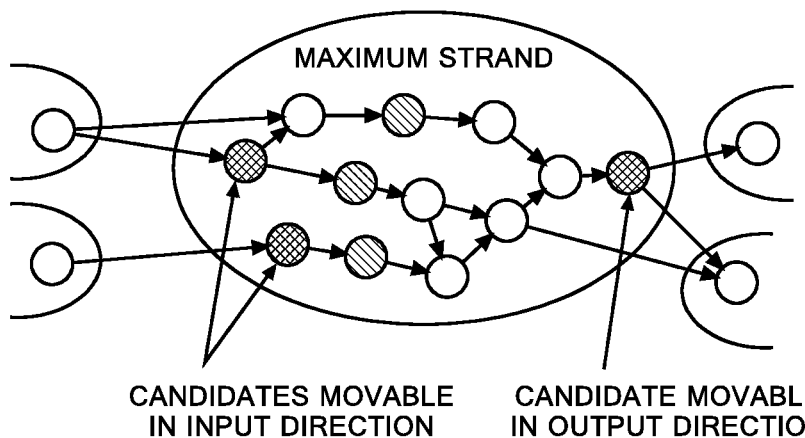
FIG. 17 is diagram showing an example of movable block candidates.

FIG. 17 is a diagram showing thus determined candidates movable in input and output directions in the maximum strand.

Figure 18:
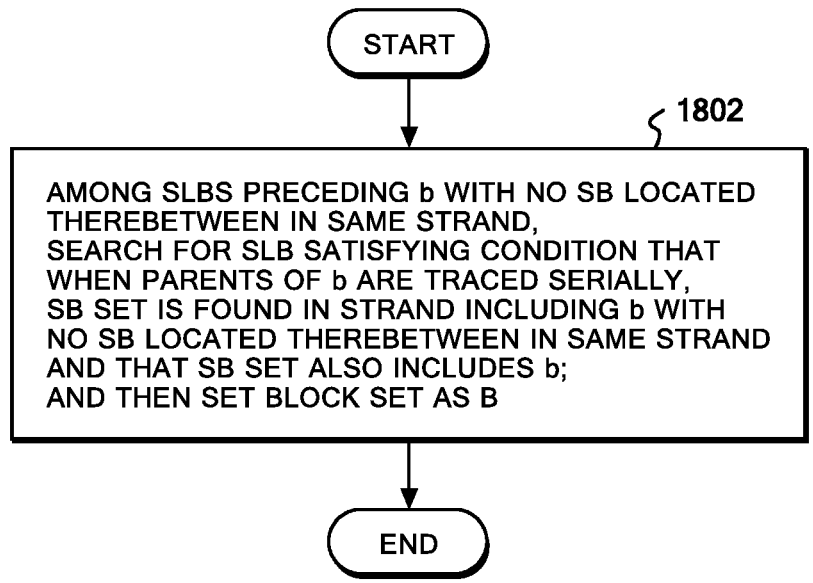
FIG. 18 is a flowchart of processing of finding a movable block candidate set.

FIG. 18 is a flowchart further describing Step 1608 in FIG. 16. In Step 1802 in FIG. 18, the strand balancing module 510 searches for any SLB having the same definer set with the block b among SLBs preceding the block b with no SB located therebetween in the same strand. Here, the definer set of a block is the set of SBs in the same strand that can be traced from the block without traversing other SBs or SLBs that is not in the same strand. The strand balancing module 510 sets a set of the blocks as a block set B.

In FIG. 19(1), blocks a and b are qualified as movable block candidates, and B={a, b}. When the strand balancing module 510 applies Step 614 in FIG. 6 to this and moves the blocks a and b in the output direction, the strand is separated as in FIG. 19(2).

Concerning an output-side block having a child of an input-side block in the same strand, even if the only output-side block is moved in the output direction, the block is afterwards returned to the input-side of the same strand itself. Thus, it is basically impossible to reduce the size of the strand.

However, if the block in question or some output-side SLBs preceding the block in question are simultaneously moved in the output direction, the maximum strand might be divided to be reduced in size.

In Step 608, the processing is attempted on a copy of the strand set Sk for each block candidate Bi (however, i is applied to j in Step 608), and a strand requiring the maximum calculation amount in a formed strand set is set as the maximum strand $s^{k+1}_{max}(i)$.

Figure 20:
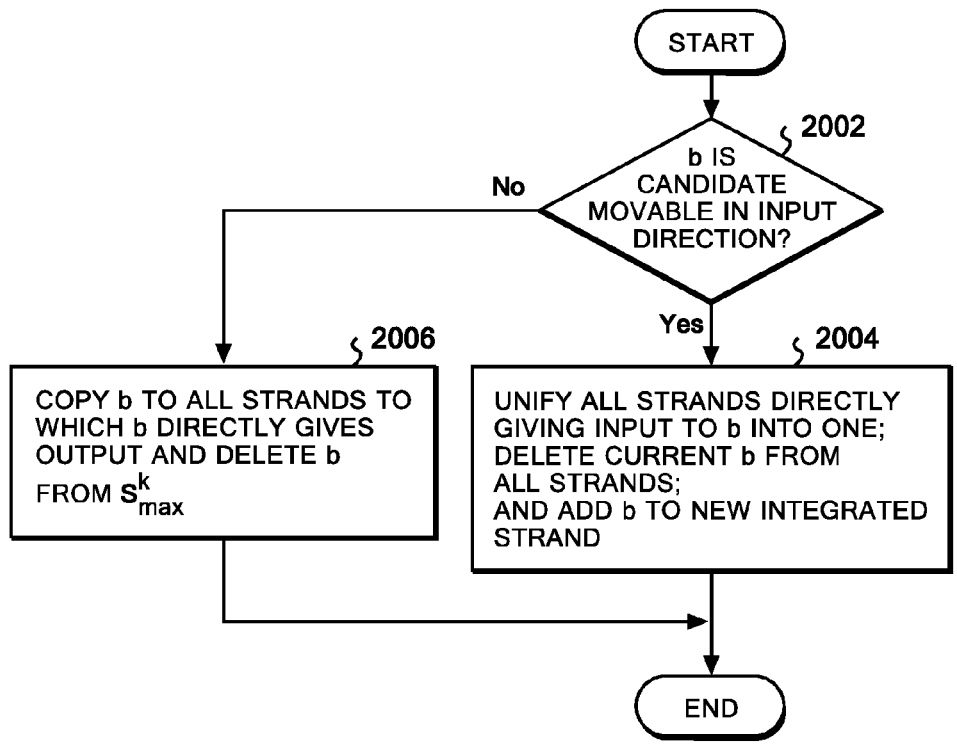
FIG. 20 is a flowchart of processing of moving a block to an adjacent strand.

FIG. 20 is a flowchart describing the processing in Step 614 in FIG. 6. The processing in FIG. 20 is executed for a block b in Bj. In Step 2002 in FIG. 20, the strand balancing module 510 determines whether or not the block b is a candidate movable in the input direction.

If the block b is a candidate movable in the input direction, the strand balancing module 510 proceeds to Step 2004 to perform processing of unifying all the strands which directly give input to the block b into one strand; deleting any current block b from all the strands; and adding the block b to the new strand thus formed by the integration.

On the other hand, if the block b is not a candidate movable in the input direction, the strand balancing module 510 proceeds to Step 2006 to perform processing of copying the block b to all the strands to which the block b directly gives output and of deleting the block b from the maximum strand $s^k_{max}$. Specifically, the processing in Step 2004 is processing of making the strand condition also applicable to a case where two or more strands which directly give output to the block b. The processing in Step 2006 is processing of: making the strand condition also applicable to a case where two or more strands which directly give output to the block b; and maintaining calculation time, of a strand formed after moving of the block b, to be as short as possible.

Figure 21:
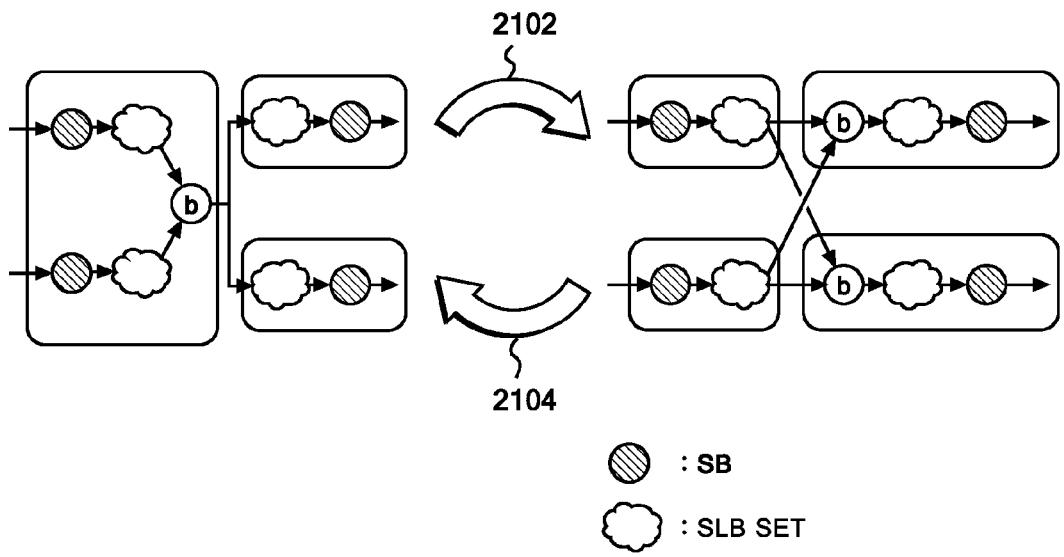
FIG. 21 is a diagram showing an example of the processing of moving a block to an adjacent strand.

Step 2006 corresponds to processing in an arrow 2102 in an example in FIG. 21, and Step 2004 corresponds to processing in an arrow 2104 therein.

Strands balanced in calculation time in this manner are assigned to CPUs and then executed. The strands can be assigned to a single CPU to be executed in parallel (however, synchronization processing is required every iteration of a simulation). However, in consideration of costs of communication between CPUs and the number of usable CPUs, multiple strand sets each including some strands are preferably formed and assigned to individual CPUs, for example.

When strands including the shared block as described above are assigned to different CPUs, processes corresponding to the shared block are to be executed by the respective CPUs (that is, repeatedly executed in different processes by the respective CPUs).

Meanwhile, when being collectively assigned to a single CPU to be executed, multiple strands formed as a strand set as described above can be executed in any order. For example, a strand requiring input from a strand included in a different strand set is executed as late as possible, and a strand giving output to a strand included in a different strand set is executed as early as possible. Thereby, a longer time can be spared after the data to be exchanged across strand sets (that is, CPUs) is prepared and until the data is actually required. In the meantime, communications are performed at the background of the simulation processing (for example, software pre-fetch or the like), so that communication delay between the processors can be hidden.

Hereinabove, the present invention has been described based on an embodiment. It should be noted that the present invention is not limited to this specific embodiment, but is applicable to various configurations, such as a modification and replacement, and techniques apparently conceivable by those skilled in the art. For example, the present invention is not limited to a specific architecture, an operating system or the like of a processor.

The embodiment has been described by taking MATLAB®/Simulink® as an example, but is not limited thereto. It should be noted that the present invention is applicable to any modeling tool.

The present invention provides the effect of reducing a bottleneck of executing processes in parallel and speeding up the processes. The effects are obtained as follows. When each of strands is formed in such a manner that every path between input and output of each of the strands includes at least one of the blocks with internal state, calculation times required for the strands are balanced as much as possible in the subsequent processing.

Although the preferred embodiment of the present invention has been described in detail, it should be understood that various changes, substitutions and alternations can be made therein without departing from spirit and scope of the inventions as defined by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 6, the flowchart and block diagrams in the Figure illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for parallelizing a plurality of codes, wherein said codes are configured by connecting a plurality of blocks with an internal state and blocks without said internal state, the method comprising:
    creating a graph expression in which a plurality of nodes represent said blocks and a plurality of edges represent links between said blocks, and then storing said graph expression in a memory of said computer;
    grouping said blocks into a plurality of strands by tracing said graph expression in such a manner that every path between an input and an output of each of said strands includes at least one of said blocks with said internal state;
    selecting a strand having a maximum calculation time from all of said strands;
    specifying, based on a parent-child relationship among said blocks with said internal state and said blocks without said internal state, a movable block without said internal state in said selected strand having said maximum calculation time; and
    moving said movable block to an adjacent strand if said calculation time of said strand having said maximum calculation time is shorter after a movement of said movable block to said adjacent strand than the calculation time before said movement:
    wherein grouping the blocks further comprises:
    visiting said nodes sequentially in said graph expression, wherein a currently visited node is a functional block without said internal state, and detecting the output from said functional block without said internal state to any of said functional blocks with said internal state and then storing said functional block with said internal state in said memory as an element in a user block set, and detecting the output from said functional block with said internal state to any of said functional blocks without said internal state and then storing said functional block with said internal state in said memory as an element in a definer block set; and forming said strands of said functional blocks on the basis of information on said user block set and information on said definer block set stored in said memory in association with said functional blocks; and wherein forming the strands further comprises at least one step selected from the group consisting of:

assigning said functional block to an adjacent strand including a block having zero user blocks and zero definer blocks, wherein said functional block has zero user blocks and zero definer blocks;

assigning said functional block to an adjacent strand including a block having zero user blocks, wherein said functional block has zero user blocks and one definer block;

assigning said functional block to an adjacent strand including a block having zero user blocks, wherein said functional block has zero user blocks and more than one definer block;

assigning said functional block to an adjacent strand including a block having zero definer blocks, wherein said functional block has one user block and zero definer blocks;

assigning said functional block to a strand including said definer block, wherein said functional block has one user block and one definer block;

assigning said functional block to a strand including said user block, wherein said functional block has one user block and more than one definer blocks;

assigning said functional block to an adjacent strand including a block having zero definer blocks, wherein said functional block has more than one user block and zero definer blocks;

assigning said functional block to a strand including said definer block, wherein said functional block has more than one user block and one definer block; and assigning said functional block redundantly to strands including said user blocks in said user block set, wherein said functional block has more than one user block and more than one definer block.

2. The computer-implemented method according to claim 1, wherein the step of specifying said movable block further comprises specifying said movable block among input-side blocks and output-side blocks in said selected strand, said input-side blocks being blocks traced in a parent-to-child direction up to a block with internal state in said strand, said output-side blocks being blocks traced in a child-to-parent direction up to a block with internal state in said strand, wherein a block specified among said input-side blocks is moved to a strand on said input side, and wherein a block specified among said output-side blocks is moved to a strand on said output side.

3. The computer-implemented method according to claim 2, wherein when said movable block is an input-side block, processing is performed in which all strands directly giving input to said movable block are unified into a new strand, said movable block is deleted from all the said strands, and said movable block is put in said newly unified strand.

4. The computer-implemented method according to claim 2, wherein when said movable block is an output-side block, processing is performed in which said movable block is copied to all strands to which said movable block directly gives its output and said movable block is deleted from said strand having said maximum calculation time.

5. The computer-implemented method according to claim 1, further comprising:

generating a plurality of computer executable codes by individually compiling said strands; and individually assigning said codes to at least one of a plurality of computer cores and a plurality of processors.

6. A non-transitory computer readable storage medium tangibly embodying a computer readable program code having computer readable instructions which, when executed, cause a computer device to carry out the steps of a method for parallelizing a plurality of codes, wherein said codes are configured by connecting a plurality of blocks with an internal state and blocks without said internal state, the method comprising:

creating a graph expression in which a plurality of nodes represent said blocks and plurality of edges represent links between said blocks, and then storing said graph expression in a memory of said computer;

grouping said blocks into a plurality of strands by tracing said graph expression in such a manner that every path between an input and an output of each of said strands includes at least one of said blocks with said internal state;

selecting a strand having a maximum calculation time from all of said strands;

specifying, based on a parent-child relationship among said blocks with said internal state and said blocks without said internal state, a movable block without said internal state in said selected strand having said maximum calculation time; and moving said movable block to an adjacent strand if said calculation time of said strand having said maximum calculation time is shorter after a movement of said movable block to said adjacent strand than the calculation time before said movement:

wherein grouping the blocks further comprises:

visiting said nodes sequentially in said graph expression, wherein a currently visited node is a functional block without said internal state, and detecting the output from said functional block without said internal state to any of said functional blocks with said internal state and then storing said functional block with said internal state in said memory as an element in a user block set, and detecting the output from said functional block with said internal state to any of said functional blocks without said internal state and then storing said functional block with said internal state in said memory as an element in a definer block set; and forming said strands of said functional blocks on the basis of information on said user block set and information on said definer block set stored in said memory in association with said functional blocks; and wherein forming the strands further comprises at least one step selected from the group consisting of:

assigning said functional block to an adjacent strand including a block having zero user blocks and zero definer blocks, wherein said functional block has zero user blocks and zero definer blocks;

assigning said functional block to an adjacent strand including a block having zero user blocks, wherein said functional block has zero user blocks and one definer block;

assigning said functional block to an adjacent strand including a block having zero user blocks, wherein said functional block has zero user blocks and more than one definer block;

assigning said functional block to an adjacent strand including a block having zero definer blocks, wherein said functional block has one user block and zero definer blocks;

assigning said functional block to a strand including said definer block, wherein said functional block has one user block and one definer block;

assigning said functional block to a strand including said user block, wherein said functional block has one user block and more than one definer blocks;

assigning said functional block to an adjacent strand including a block having zero definer blocks, wherein said functional block has more than one user block and zero definer blocks;

assigning said functional block to a strand including said definer block, wherein said functional block has more than one user block and one definer block; and assigning said functional block redundantly to strands including said user blocks in said user block set, wherein said functional block has more than one user block and more than one definer block.

7. The computer readable storage medium according to claim 6:

wherein the step of specifying said movable block further comprises specifying said movable block among input-side blocks and output-side blocks in said selected strand, said input-side blocks being blocks traced in a parent-to-child direction up to a block with internal state in said strand, said output-side blocks being blocks traced in a child-to-parent direction up to a block with internal state in said strand, wherein a block specified among said input-side blocks is moved to a strand on said input side, and wherein a block specified among said output-side blocks is moved to a strand on said output side.

8. The computer readable storage medium according to claim 7, wherein when said movable block is an input-side block, processing is performed in which all strands directly giving input to said movable block are unified into a new strand, said movable block is deleted from all the said strands, and said movable block is put in said newly unified strand.

9. The computer readable storage medium according to claim 7, wherein when said movable block is an output-side block, processing is performed in which said movable block is copied to all strands to which said movable block directly gives its output and said movable block is deleted from said strand having said maximum calculation time.

10. A system for parallelizing a plurality of codes by processing of a computer, wherein said codes are configured by connecting a plurality of blocks with an internal state and blocks without said internal state, the system comprising:

a memory;

a processor communicatively coupled to the memory; and a parallelizing module communicatively coupled to the memory and the processor, wherein the parallelizing module is configured to perform the steps of a method comprising:

creating a graph expression in which a plurality of nodes represent said blocks and a plurality of edges represent links between said blocks, and then storing said graph expression in said memory of said computer;

grouping said blocks into a plurality of strands by tracing said graph expression in such a manner that every path between an input and an output of each of said strands includes at least one of said blocks with said internal state;

selecting a strand having a maximum calculation time from all said strands;

specifying, based on a parent-child relationship among said blocks with said internal state and said blocks without said internal state, a movable block without said internal state in said selected strand having said maximum calculation time; and moving said movable block to an adjacent strand if said calculation time of said strand having said maximum calculation time is shorter after a movement of said movable block to said adjacent strand than the calculation time before said movement:

wherein grouping the blocks further comprises:

visiting said nodes sequentially in said graph expression, wherein a currently visited node is a functional block without said internal state, and detecting the output from said functional block without said internal state to any of said functional blocks with said internal state and then storing said functional block with said internal state in said memory as an element in a user block set, and detecting the output from said functional block with said internal state to any of said functional blocks without said internal state and then storing said functional block with said internal state in said memory as an element in a definer block set; and forming said strands of said functional blocks on the basis of information on said user block set and information on said definer block set stored in said memory in association with said functional blocks; and wherein forming the strands further comprises at least one step selected from the group consisting of:

assigning said functional block to an adjacent strand including a block having zero user blocks and zero definer blocks, wherein said functional block has zero user blocks and zero definer blocks;

assigning said functional block to an adjacent strand including a block having zero user blocks, wherein said functional block has zero user blocks and one definer block;

assigning said functional block to an adjacent strand including a block having zero user blocks, wherein said functional block has zero user blocks and more than one definer block;

assigning said functional block to an adjacent strand including a block having zero definer blocks, wherein said functional block has one user block and zero definer blocks;

assigning said functional block to a strand including said definer block, wherein said functional block has one user block and one definer block;

assigning said functional block to a strand including said user block, wherein said functional block has one user block and more than one definer blocks;

assigning said functional block to an adjacent strand including a block having zero definer blocks, wherein said functional block has more than one user block and zero definer blocks;

assigning said functional block to a strand including said definer block, wherein said functional block has more than one user block and one definer block; and assigning said functional block redundantly to strands including said user blocks in said user block set, wherein said functional block has more than one user block and more than one definer block.

11. The parallelization system according to claim 10,
wherein for the step of specifying said movable block further comprises specifying said movable block among input-side blocks and output-side blocks in said selected strand, said input-side blocks being blocks traced in a parent-to-child direction up to a block with internal state in said strand, said output-side blocks being blocks traced in a child-to-parent direction up to a block with internal state in said strand,
wherein a block specified among said input-side blocks is moved to a strand on said input side, and
wherein a block specified among said output-side blocks is moved to a strand on said output side.

12. The parallelization system according to claim 11, wherein when said movable block is an input-side block, processing is performed in which all strands directly giving input to said movable block are unified into a new strand, said movable block is deleted from all the said strands, and said movable block is put in said newly unified strand.

13. The parallelization system according to claim 11, wherein when said movable block is an output-side block, processing is performed in which said movable block is copied to all strands to which said movable block directly gives its output and said movable block is deleted from said strand having said maximum calculation time.

14. The computer readable storage medium according to claim 6, the method further comprising:
generating a plurality of computer executable codes by individually compiling said strands; and
individually assigning said codes to at least one of a plurality of computer cores and a plurality of processors.

15. The parallelization system according to claim 10, the method further comprising:
Generating a plurality of computer executable codes by individually compiling said strands; and
individually assigning said codes to at least one of a plurality of computer cores and a plurality of processors.

* * * * *